United States Patent
Yamamoto et al.

(10) Patent No.: US 10,680,279 B2
(45) Date of Patent: Jun. 9, 2020

(54) LITHIUM ION SECONDARY BATTERY ELECTRODE AND LITHIUM ION SECONDARY BATTERY

(71) Applicant: TOYOTA JIDOSHA KABUSHIKI KAISHA, Toyota-shi, Aichi-ken (JP)

(72) Inventors: Yuji Yamamoto, Toyota (JP); Ryuta Sugiura, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 66 days.

(21) Appl. No.: 16/154,841

(22) Filed: Oct. 9, 2018

(65) Prior Publication Data
US 2019/0115619 A1    Apr. 18, 2019

(30) Foreign Application Priority Data
Oct. 13, 2017 (JP) .................. 2017-199478

(51) Int. Cl.
*H01M 10/0525* (2010.01)
*H01M 4/66* (2006.01)
*H01M 4/36* (2006.01)
*H01M 4/505* (2010.01)
*H01M 4/525* (2010.01)

(52) U.S. Cl.
CPC ....... *H01M 10/0525* (2013.01); *H01M 4/364* (2013.01); *H01M 4/366* (2013.01); *H01M 4/661* (2013.01); *H01M 4/505* (2013.01); *H01M 4/525* (2013.01)

(58) Field of Classification Search
CPC .. H01M 10/0525; H01M 4/661; H01M 4/366; H01M 4/364; H01M 4/505; H01M 4/525; H01M 4/13; H01M 4/62; H01M 4/628
See application file for complete search history.

(56) References Cited

U.S. PATENT DOCUMENTS

2016/0064729 A1    3/2016    Shindo

FOREIGN PATENT DOCUMENTS

JP    2016-051610 A    4/2016

*Primary Examiner* — Cynthia K Walls
(74) *Attorney, Agent, or Firm* — Sughrue Mion, PLLC (57) ABSTRACT

The present invention provides an art that can improve further battery performance of lithium ion secondary batteries in which a lithium salt is added to the interior of the batteries. A herein disclosed lithium ion secondary battery electrode is constituted by disposing, on a surface of a foil-like electrode current collector, an electrode mixture layer that contains a particulate electrode active material. With this electrode, a lithium salt having a lithium ion intake capability is added to the electrode mixture layer; dividing the electrode mixture layer into three equal regions, which are a first region, a second region, and a third region, in a thickness direction, an amount of the lithium salt component in the first region and an amount of the lithium salt component in the third region satisfy the relationship $0 < S3/S1 \leq 4$; and a maximum particle diameter of aggregates of the lithium salt present in the electrode mixture layer is less than 1 μm.

7 Claims, 5 Drawing Sheets

LITHIUM ION SECONDARY BATTERY ELECTRODE AND LITHIUM ION SECONDARY BATTERY

CROSS REFERENCE TO RELATED APPLICATIONS

This application cites priority based on Japanese Patent Application No. 2017-199478 filed Oct. 13, 2017, the contents of which are incorporated herein in their entirety by reference.

BACKGROUND OF THE INVENTION

1. Field of the Invention

The present invention relates to lithium ion secondary batteries. More particularly, the present invention relates to the electrode used in lithium ion secondary batteries and to a lithium ion secondary battery that uses this electrode.

2. Description of the Related Art

Secondary batteries, e.g., the lithium ion secondary battery, nickel hydride battery, and so forth, have in recent years been preferentially used as portable power sources for, e.g., personal computers and portable devices, and as a drive power source for vehicles. In particular, the lithium ion secondary battery, which provides high energy densities at light weights, is increasing in importance as the high-output power sources (for example, the power source that drives the motor connected to the drive wheels of a vehicle) used in vehicles such as electric automobiles and hybrid automobiles.

The lithium ion secondary battery (also referred to below simply as "battery") is constituted of an electrolyte solution filled between a pair of electrodes, i.e., a positive electrode and a negative electrode. An active material (positive electrode active material and negative electrode active material) capable of the insertion and extraction of lithium (Li) is present in the mixture layer of the positive electrode and the mixture layer of the negative electrode. Charge/discharge with such a lithium ion secondary battery is performed by the migration of the Li ion between the positive electrode and negative electrode through the electrolyte solution.

Art in which a lithium salt having a Li ion intake capability is added to the battery interior (for example, to the electrolyte solution or the positive electrode mixture layer) has heretofore been proposed for the lithium ion secondary battery. For example, Japanese Patent Application Laid-open No. 2016-51610 discloses art in which a first lithium salt (lithium phosphate) and a second lithium salt (e.g., lithium carbonate) are added to the positive electrode mixture layer with the proportions for these lithium salts being adjusted to specific values. The art described in Japanese Patent Application Laid-open No. 2016-51610 can improve the durability and internal resistance of a lithium ion secondary battery.

SUMMARY OF THE INVENTION

There has been increasingly strong demand in recent years for improvements in the performance of lithium ion secondary batteries in order to enable their even more preferential use as, for example, a high-output power source for vehicles. There is also desire for additional improvements in the aforementioned art related to lithium salt addition.

The present invention was achieved in response to this demand. An object of the present invention is to provide an art that can more advantageously improve the performance of lithium ion secondary batteries having a lithium salt added to the battery interior.

A lithium ion secondary battery electrode (also referred to below simply as the "electrode") with the following constitution is provided as an aspect of the present invention in order to realize the aforementioned object.

The herein disclosed lithium ion secondary battery electrode comprises a foil-like electrode current collector and an electrode mixture layer disposed on a surface of the electrode current collector. And the electrode mixture layer contain a particulate electrode active material.

A lithium salt having a lithium ion intake capability is added to the electrode mixture layer in this electrode. In addition, dividing the electrode mixture layer into three equal regions in the thickness direction and designating these three regions as a first region, a second region, and a third region moving from the electrode current collector side to the surface of the electrode mixture layer, in this electrode the amount $S1$ of the lithium salt component in the first region and the amount $S3$ of the lithium salt component in the third region satisfy the relationship in formula (1) below. The maximum particle diameter of aggregates of the lithium salt present in the electrode mixture layer in this electrode is also less than 1 μm.

$$0 < S3/S1 \leq 4 \tag{1}$$

In order to improve the performance of lithium ion secondary batteries over that heretofore available, the present inventor considered improving the art related to lithium salt addition.

Figure 4:
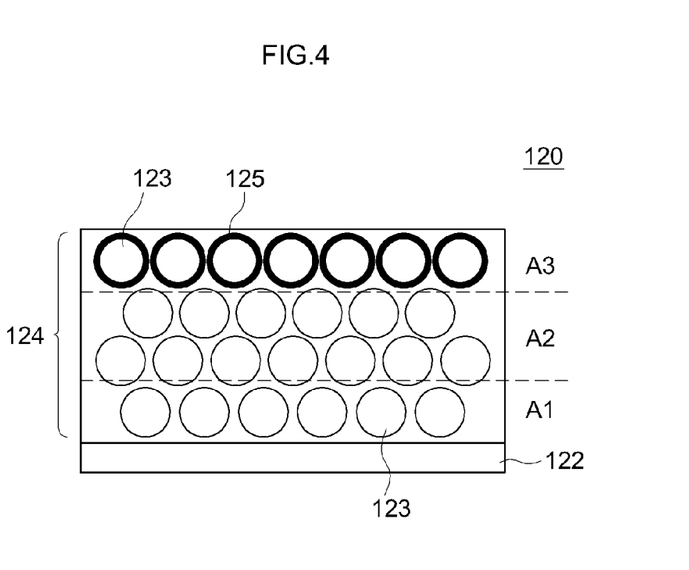
FIG. 4 is a cross-sectional diagram that schematically shows an example of a conventional lithium ion secondary battery electrode.

As a result of various investigations, it was discovered that, when a lithium salt has been added to the battery interior, the input/output characteristics of the battery undergo substantial changes as a function of the state of the distribution of the lithium salt in the electrode mixture layer. Specifically, when a lithium salt has been added to the electrolyte solution, as shown in FIG. 4 the electrolyte solution readily comes into contact with the region (the third region A3) in the vicinity of the surface of the electrode mixture layer 124 of the electrode 120, and as a consequence the lithium salt 125 readily occurs in large amounts in this third region A3. When the lithium salt 125 is skewed in such a manner to the vicinity of the surface of the electrode mixture layer 124, only the Li ion intake capability in the region in the vicinity of the surface is increased and the efficient supply of Li ion to the electrode active material 123 in the region (the first region A1) in the vicinity of the electrode current collector 122 is impaired. As a result,the resistance in the first region A1 of the electrode mixture layer 124 undergoes a local increase and as a consequence a suitable improvement in the input/output characteristics of the battery cannot be brought about notwithstanding the addition of a lithium salt.

Based on this knowledge, the present inventor concluded that the local increase in the resistance of the electrode mixture layer could be suppressed if a suitable disposition of the lithium salt could be brought about in the electrode mixture layer of the first region in the vicinity of the electrode current collector. As a result of various experiments, the present inventor arrived at the formation of an electrode mixture layer in which the amount $S1$ of the lithium salt component in the first region and the amount S3 of the lithium salt component in the third region satisfied the relationship 0<S3/S1≤4.

In this case, a sufficient amount of the lithium salt is then present in the first region in the vicinity of the electrode current collector and as a consequence Li ion can be efficiently supplied to this first region and the local increase in the resistance of the electrode mixture layer can be suppressed.

Figure 5:
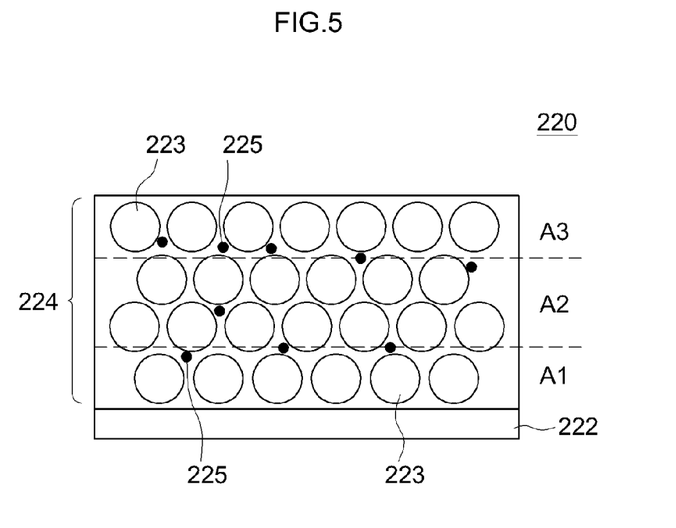
FIG. 5 is a cross-sectional diagram that schematically shows another example of a conventional lithium ion secondary battery electrode.

Notwithstanding this improvement, the present inventor continued investigations into additional improvements in battery performance. During these investigations, the present inventor concluded that the input/output characteristics of a battery are also influenced by the state of aggregation of the lithium salt, and not just by the state of the lithium salt distribution in the thickness direction of the electrode mixture layer as indicated above. Specifically, and as shown in FIG. 5, due to the difficulty of bringing about a favorable dispersion of the lithium salt in the electrode mixture layer, aggregates 225 of the lithium salt can form in the electrode mixture layer 224 of the battery 220. When these aggregates 225 form, the lithium ion is drawn and concentrated toward the aggregates 225, and in such a case the efficient supply of Li ion to the electrode active material 223 of the electrode mixture layer 224 as a whole is impaired even when the presence of sufficient lithium salt in the vicinity of the electrode current collector 222 (the first region A1) has been brought about. Due to this, the resistance of the electrode mixture layer 224 undergoes a local increase and the input/output characteristics may deteriorate.

As a result of various experiments based on this knowledge, the present inventor discovered that the maximum particle diameter of the lithium salt aggregates must be brought to less than 1 μm (i.e., large aggregates of equal to or greater than 1 μm are not present) in order to fabricate a high-performance lithium ion secondary battery electrode.

The herein disclosed electrode was achieved based on the preceding knowledge. The electrode mixture layer formed therein satisfies formula (1) whereby a sufficient amount of lithium salt is then present in the first region in the vicinity of the electrode current collector, and this electrode mixture layer also has a maximum particle diameter for the lithium salt aggregates of less than 1 μm.

Because Li ion can be efficiently supplied to the entire electrode mixture layer in this lithium ion secondary battery electrode, local increases in the resistance of the electrode mixture layer can be securely suppressed. Accordingly, the use of this electrode in a lithium ion secondary battery makes it possible to obtain a battery in which the input/output characteristics are substantially improved over that heretofore available.

In this Specification, the "amount of lithium salt component" can be measured by detaching the electrode mixture layer so as to provide three equal portions in the thickness direction and carrying out ion chromatography (IC) on each of the electrode active material layers provided by this equal three-way division. In addition, the "particle diameter of the lithium salt aggregate" can be measured by taking a photograph, using a scanning electron microscope (SEM), of the cross section of the electrode mixture layer along its thickness direction and performing element mapping of the lithium salt in the cross section of the electrode mixture layer using analysis by energy-dispersive X-ray spectroscopy (EDS) of the SEM image.

In a preferred aspect of the herein disclosed lithium ion secondary battery electrode, the surface of the electrode active material in at least the first region is coated by lithium salt.

By coating the surface of the electrode active material with lithium salt in this manner, Li ion can be more efficiently supplied to the electrode active material and, in combination with therewith, reductions in the battery capacity can be prevented by inhibiting the decomposition of the electrolyte solution at the electrode active material surface. The battery performance of the lithium ion secondary battery can as a result be still more advantageously improved. Particularly with regard to the first region in the vicinity of the electrode current collector, the effect due to coating with the lithium salt as described above can be particularly favorably exhibited due to the difficulty of efficiently supplying Li ion.

In another preferred aspect of the herein disclosed lithium ion secondary battery electrode, the lithium salt is any of lithium acetate, lithium fluorophosphate, and lithium sulfate.

These lithium salts have a favorable lithium ion intake capability and as a consequence can bring about a favorable reduction in the resistance of the electrode mixture layer.

In another preferred aspect of the herein disclosed lithium ion secondary battery electrode, the lithium fluorophosphate is lithium difluorophosphate.

Among the specific examples of lithium salts provided above, lithium difluorophosphate, which is a type of lithium, fluorophosphate, can provide an additional favorable contribution to improving battery performance. While the cause of this is unclear, it is hypothesized that lithium difluorophosphate has a stronger lithium ion intake capability than the other lithium salts and also that it is provided with the ability to inhibit decomposition of the electrolyte solution at the electrode active material surface.

In another preferred aspect of the herein disclosed lithium ion secondary battery electrode, the content of the lithium salt is 0.1 wt % to 5 wt % where the total mass of the solids fraction of the electrode mixture layer is 100 wt %.

As has been described above, Li ion can be efficiently supplied to the electrode active material by causing a lithium salt to be present in a satisfactory amount in the region in the vicinity of the electrode current collector (the first region), but without causing the formation of large aggregates. However, when the content of the lithium salt in the electrode mixture layer is too great, the Li ion take effect due to the lithium salt is then too strong and the resistance in the electrode mixture layer may be raised instead. When this is taken into consideration, the lithium salt content is preferably 0.1 wt % to 5 wt %. The lithium salt content in the electrode mixture layer can be measured by carrying out quantitative analysis of the lithium salt using ion chromatography (IC).

A lithium ion secondary battery having the following constitution is provided in another aspect of the present invention.

The herein disclosed lithium ion secondary battery is provided with a positive electrode in which a positive electrode mixture layer is formed on the surface of a positive electrode current collector, a negative electrode in which a negative electrode mixture layer is formed on the surface of a negative electrode current collector, and an electrolyte solution filled between the positive electrode and the negative electrode.

The lithium ion secondary battery electrode according to any of the individual aspects described above is used for at least one of the positive electrode and the negative electrode in the herein disclosed battery.

With the electrode according to each of the aspects described above, an advantageous Li ion intake capability can be exhibited by the lithium salt because a sufficient amount of lithium salt is present in the first region in the vicinity of the electrode current collector and because large aggregates having a particle diameter of 1 µm and larger are not formed. As a consequence, Li ion can be efficiently supplied to the entire electrode mixture layer and a favorable reduction in resistance can be brought about in the electrode mixture layer.

Accordingly, a lithium ion secondary battery having substantially improved input/output characteristics can be fabricated by using an electrode according to each of the aspects that have been described in the preceding. Moreover, such a lithium ion secondary battery can he advantageously used for, e.g., high-output power sources for vehicles.

In another preferred aspect of the herein disclosed lithium ion secondary battery, the lithium ion secondary battery electrode according to any of the individual aspects described above is used for the positive electrode.

The electrode according to each of the aspects described above can be advantageously used for either the positive electrode or the negative electrode in a lithium ion secondary battery. However, when one considers inhibition of the reductive decomposition of the electrolyte solution, the electrode according to each of the aspects described above is preferably used for the positive electrode of a lithium ion secondary battery.

DETAILED DESCRIPTION OF THE PREFERRED EMBODIMENTS

Embodiments of the present invention are described in the following with reference to the figures.

In this Specification, "lithium ion secondary battery" refers to a secondary battery that uses the Li ion as the electrolyte ion and that engages in charge/discharge by the movement between the positive and negative electrodes of the charge associated with the Li ion. The secondary batteries generally referred to as lithium secondary batteries (or lithium ion batteries) and so forth are typical examples that are encompassed by the lithium ion secondary battery in this Specification.

I. Lithium Ion Secondary Battery Electrode

A lithium ion secondary battery electrode according to an embodiment of the present invention is described in the following. While the herein disclosed electrode may be used for either the positive electrode or negative electrode of a lithium ion secondary battery, the description in the following embodiment mainly concerns use as the negative electrode in a lithium ion secondary battery.

Figure 1:
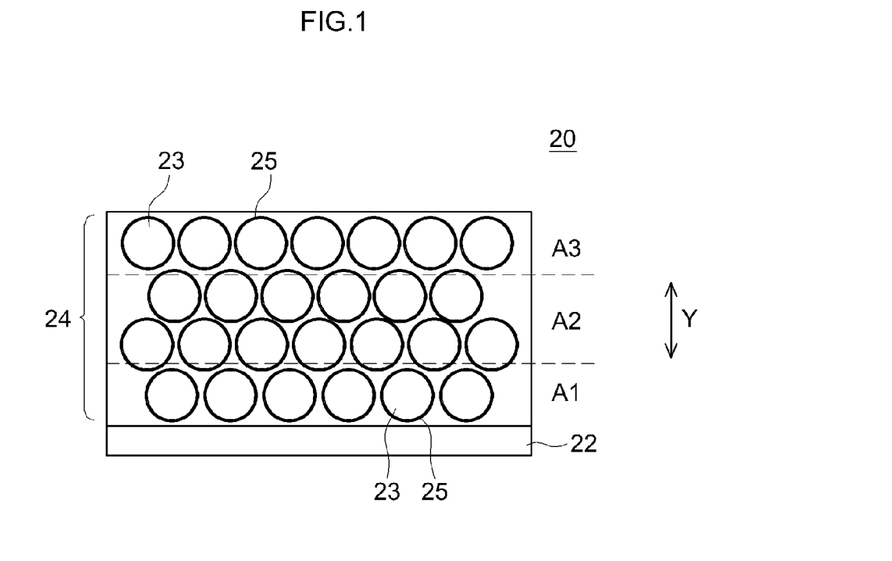
FIG. 1 is a cross-sectional diagram that schematically shows the negative electrode of a lithium ion secondary battery according to an embodiment of the present invention.

FIG. 1 is a cross-sectional diagram that schematically shows the negative electrode according to the present embodiment for a lithium ion secondary battery. FIG. 1 shows the cross section along the thickness direction Y of a negative electrode mixture layer 24.

As shown in FIG. 1, the negative electrode 20 according to the present embodiment for a lithium ion secondary battery is provided with a foil-like negative electrode current collector 22 and a negative electrode mixture layer 24 disposed on the surface of the negative electrode current collector 22. A negative electrode active material 23, which is a material capable of the insertion and extraction of the Li ion, is contained in this negative electrode mixture layer 24.

(1) Negative Electrode Current Collector

The negative electrode current collector 22 is a foil-like electroconductive member. The structures and materials that are used for the negative electrode current collector of ordinary conventional lithium ion secondary batteries can be adopted for this negative electrode current collector 22. As a consequence, a detailed description has been omitted from this Specification, but a copper foil having a thickness of 5 µm to 30 µm can be used as a specific example of the negative electrode current collector 22.

(2) Negative Electrode Mixture Layer

The negative electrode mixture layer 24 contains the negative electrode active material 23 and additives in addition to this. In addition to the negative electrode active material 23 and additives, a lithium salt 25 is present in the negative electrode mixture layer 24 of the negative electrode 20 according to the present embodiment. Each of the substances present in the negative electrode mixture layer is described below.

(a) Negative Electrode Active Material

The negative electrode active material 23 is a particulate material capable of the insertion and extraction of the lithium ion. There are no particular limitations on the material of the negative electrode active material 23, and a single one of the various materials usable as the negative electrode active material of a lithium ion secondary battery can be used by itself or a combination (mixture or composite) of two or more of such materials can be used. The following are advantageous examples of this negative electrode active material 23: graphite, graphitization-resistant carbon (hard carbon), easily graphitizable carbon soft carbon), carbon nanotubes, and carbon materials having a structure that is a combination of the preceding. Viewed from the perspective of the energy density, the use is preferred among the preceding of graphitic materials (natural graphite, artificial graphite, and so forth).

The content of the negative electrode active material 23, using 100 wt % for the total mass of the solids fraction of the negative electrode mixture layer 24, is preferably set into the range of 80 wt % to 99.45 wt % (preferably 90 wt % to 98.9 wt %, for example, 97 wt %).

(b.) Additives

The additives that can be present in the negative electrode mixture layer 24 can be exemplified by binders, thickeners, and so forth. Various polymeric materials can be used for the binder, for example, styrene-butadiene rubber (SBR), polytetrafluoroethylene (PTFE), polyethylene (PE), polyacrylic acid (PAA), polyvinylidene fluoride (PVH), and polyvinylidene chloride (PVdC). For example, carboxymethyl cellulose (CMC), methyl cellulose (MC), and so forth may be advantageously used for the thickener.

The additive content, using 100 wt % for the total mass of the solids fraction of the negative electrode mixture layer 24, is preferably set into the range of 0.5 wt % to 10 wt % (preferably 1 wt % to 5 wt %. for example, 2 wt %).

(c) Lithium Salt

Lithium salt 25 is added to the negative electrode mixture layer 24 in the negative electrode 20 according to the present embodiment. This lithium salt 25 has an Li ion intake capability. Specifically, since a high charge density is locally assumed in regions where the lithium salt 25 is present, the Li ion intake performance is increased. Due to this, when the lithium salt 25 is present in the negative electrode mixture layer 24, Li ion can be efficiently supplied to the negative electrode active material 23 and a reduction in the resistance in the negative electrode mixture layer 24 can be brought about.

For example, lithium acetate, lithium fluorophosphate, lithium sulfate, and so forth are used as the lithium salt 25. Since these have an advantageous Li ion intake capability, they can bring about a more favorable reduction in the resistance of the negative electrode mixture layer 24. In addition, the lithium fluorophosphate can be exemplified by lithium monofluorophosphate and lithium difluorophosphate, but a more favorable increase in the battery performance can be brought about when lithium difluorophosphate is used.

A favorable Li ion intake capability cannot be expressed when the content of the lithium salt 25 in the negative electrode mixture layer 24 is too low. When, on the other hand, this content is too high, the content of the negative electrode active material 23 is then relatively low and the input/output characteristics can decline. When this is taken into consideration, the content of the lithium salt 25, using 100 wt % for the total mass of the solids fraction in the negative electrode mixture layer 24, is preferably 0.05 wt % to 10 wt % (preferably 0.1 wt % to 5 wt %, for example, 1 wt %).

The negative electrode mixture layer 24 in the negative electrode 20 according to the present embodiment is formed such that—dividing the negative electrode mixture layer 24 into three equal regions in the thickness direction Y as shown in FIG. 1 and designating these three regions as a first region A1, a second region A2, and a third region A3 moving from the negative electrode current collector 22 side to the surface of the electrode mixture layer 24 (from the bottom to the top in FIG. 1)—the amount S1 of the lithium salt component first region A1 and the amount S3 of the lithium salt component in the third region A3 satisfy the relationship in formula (1).

$$0<S3/S1\leq 4 \quad (1)$$

The lithium salt 25 is present in a sufficient amount in the region (the first region A1) in the vicinity of the negative electrode current collector 22 in a negative electrode 20 for which, as indicated above, the proportion (S3/S1) of the amount S3 of the lithium salt component in the third region A3 relative to the amount S1 of the lithium salt component in the first region A1 exceeds 0 and is not more than 4. The Li ion can as a consequence be efficiently supplied to the negative electrode active material 23 of the first region A1. The resistance of the negative electrode mixture layer 24 can be favorably reduced as a result.

The lower limit for S3/S1 is preferably 0.1 or more and is more preferably 0.5 or more. The upper limit is preferably 3 or less and is more preferably 2 or less. When S3/S1 is 1 (when the amount of the lithium salt component is the same in the first region A1 as in the third region A3), the lithium salt is then uniformly present throughout the entire negative electrode mixture layer 24 and due to this a particularly efficient supply of Li ion can be achieved.

Furthermore, the maximum particle diameter of lithium salt aggregates is less than 1 in the present embodiment. This can prevent the Li ion from being drawn to and concentrated at large lithium salt aggregates of 1 μm or larger. As a result, the Li ion can be efficiently supplied to the entire negative electrode mixture layer 24 and an even more favorable reduction in the resistance of the negative electrode mixture layer 24 can be brought about.

In this regard, preferably the lithium salt 25 is not present as aggregates as indicated above and coats the surface of the negative electrode active material 23 in the form of a thin film as shown in FIG. 1. When the surface of the negative electrode active material 23 is coated with a thin film of the lithium salt 25 in this manner, Li ion can be even more efficiently supplied to each portion of the negative electrode active material 23 and in combination with this the decomposition of the electrolyte solution at the active material surface can be suppressed. As a result, this can contribute to further enhancements in the battery performance.

As indicated above, the lithium salt need not be present as the thin film shown in FIG. 1, and it is sufficient for the lithium salt to be present in the negative electrode mixture layer in a form in which the maximum particle diameter is less than 1 μm. For example, the Li ion can be efficiently supplied to the entire negative electrode mixture layer and a favorable reduction in the resistance of the negative electrode mixture layer can be brought about even when a particulate lithium salt having a particle diameter of less than 1 μm is dispersed in the negative electrode mixture layer.

As indicated in the preceding, the negative electrode 20 according to the present embodiment satisfies the relationship $0<S3/S1\leq 4$ between the amount S1 of the lithium salt component in the first region A1 and the amount S3 of the lithium salt component in the third region A3 and has a maximum particle diameter for the lithium salt aggregates of less than 1 μm.

As a result of this, the presence of the lithium salt 25 in the negative electrode mixture layer 24 in a preferred distribution can be brought about, as a consequence of which Li ion can be efficiently supplied to the negative electrode active material 23 of the entire negative electrode mixture layer 24 and the resistance of the negative electrode mixture layer 24 can be favorably reduced.

Accordingly, a lithium ion secondary battery having input/output characteristics favorably improved over those heretofore available can be obtained by using the negative electrode 20 according to the present embodiment.

2. Production of Lithium Ion Secondary Battery Electrode

Methods for producing the negative electrode 20 according to the present embodiment are described in the following.

Various methods can be adopted in order to produce the negative electrode 20 according to the present embodiment, and as a consequence the production method here does not limit the present invention. However, for example, a method as described in the following can be adopted.

In the production of the negative electrode for common lithium ion secondary batteries, the electrode active material and additives (binder and so forth) are first dispersed in a prescribed solvent to prepare a negative electrode mixture paste. After this negative electrode mixture has been coated on the surface of the negative electrode current collector, the negative electrode mixture is dried by the execution of a heat treatment. This yields a negative electrode in which a negative electrode mixture layer is formed on the surface of the negative electrode current collector.

In the production of the negative electrode 20 according to the present embodiment described above, for example, preferably the lithium salt is added during the preparation of the negative electrode mixture paste and a salt-dissolving solvent is used for the solvent used for dispersion. This makes it possible to easily produce a negative electrode 20 that satisfies formula (1) and for which the maximum particle diameter of the lithium salt aggregates is less than 1 μm.

Considered more specifically, when lithium salt is added to the electrolyte solution, as shown in FIG. 4 the lithium salt 125 may segregate to the vicinity of the surface of the electrode mixture layer 124 (the third region A3). In view of this, the addition of the lithium salt to the paste prior to the formation of the negative electrode mixture layer may be considered as a means for bringing about the presence of the lithium salt in the vicinity of the electrode current collector 122 (the first region A1).

However, when this is done, the lithium salt may aggregate with itself to form large aggregates 225 (refer to FIG. 5). The production method described above takes these points into consideration and uses a salt-dissolving solvent for the solvent used for dispersion. This "salt-dissolving solvent" denotes a high-polarity solvent having a dielectric constant (ε) of 40 or larger, of which water (dielectric constant: 80) and propylene carbonate (dielectric constant: 65) are examples. The use of this salt-dissolving solvent makes possible the dissolution of the lithium salt when the lithium salt is added to the negative electrode mixture. As a consequence, aggregation of the lithium, salt with itself can be stopped and the lithium salt can be favorably dispersed in the negative electrode mixture. This results in the formation of a negative electrode mixture layer 2.4 that satisfies formula (1) and for which the maximum particle diameter of the lithium salt aggregates is less than 1 μm. On the other hand, the lithium salt is sparingly soluble in low-polarity solvents (solvent in which salts are not soluble) such as N-methylpyrrolidone (dielectric constant: 32.2), and as a consequence when such a solvent is used the lithium salt may aggregate with itself with the formation of large aggregates 225 as shown in FIG. 5.

The method for producing the negative electrode that has been described in the preceding does not limit the present invention, and various methods can be adopted.

For example, in another method for producing the negative electrode 20 according to the present embodiment, the lithium salt may be attached to each of the negative electrode active material particles prior to the preparation of the negative electrode mixture paste. In this case, the means for attaching the lithium salt to the negative electrode active material can be exemplified by vapor deposition procedures such as physical vapor deposition and chemical vapor deposition and by physical composite formation using, for example, a ball mill.

When such methods are used, a negative electrode 20 according to the present embodiment, for which formula (1) is satisfied and the maximum particle diameter of the lithium salt aggregates is less than 1 μm, can still be obtained using a solvent, such as N-methylpyrrolidone (NMP), that does not dissolve salts.

3. Lithium Ion Secondary Battery

A lithium ion secondary battery according to another embodiment of the present invention is described in the following. The negative electrode 20 according to the embodiment described above is used in the lithium ion secondary battery described in the present embodiment.

Figure 2:
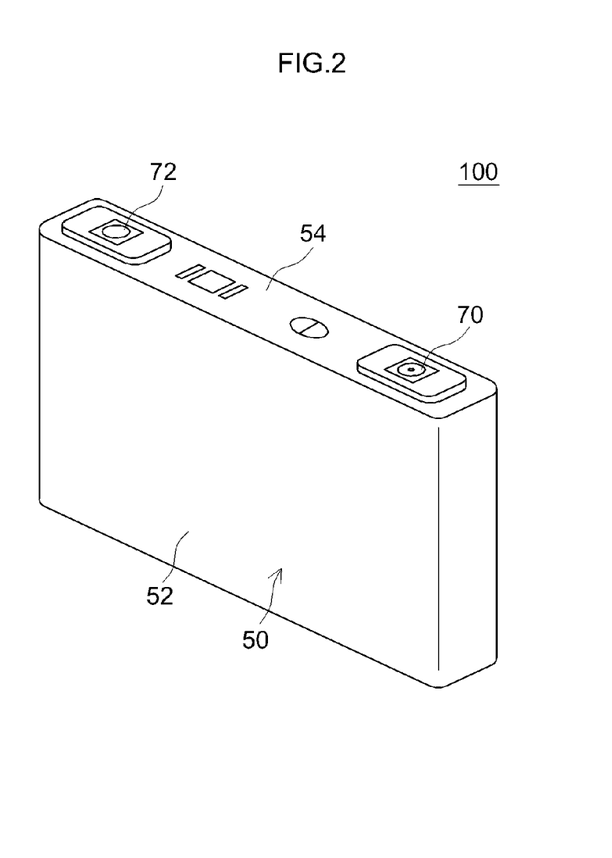
FIG. 2 is a perspective diagram that schematically shows the external shape of a lithium ion secondary battery according to another embodiment of the present invention.
Figure 3:
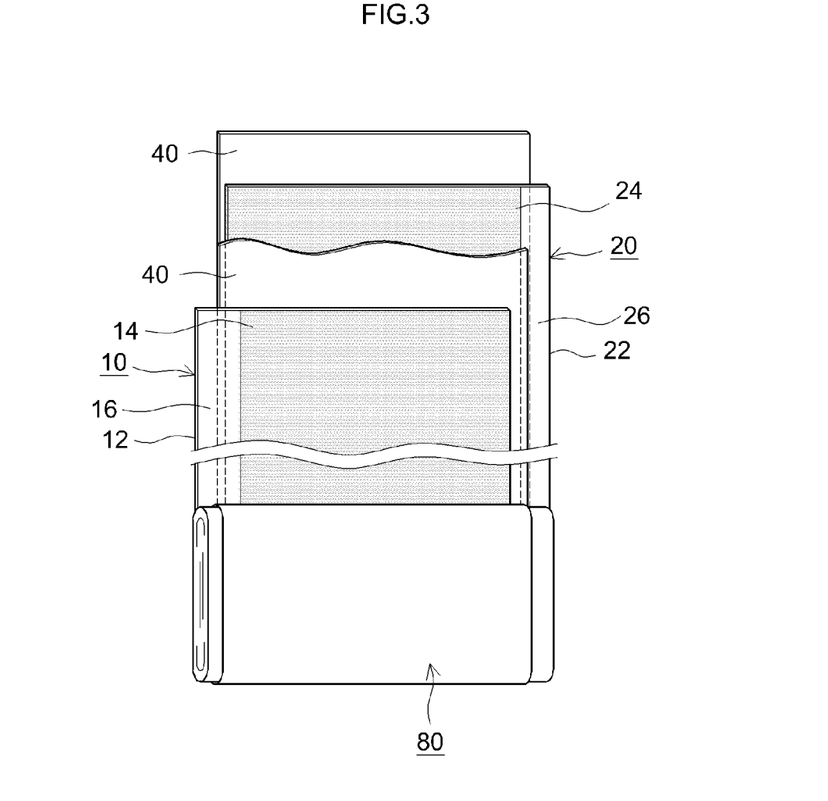
FIG. 3 is a perspective diagram that schematically shows an electrode assembly for a lithium ion secondary battery according to another embodiment of the present invention.

FIG. 2 is a perspective diagram that schematically shows the lithium ion secondary battery according to the present embodiment. FIG. 3 is a perspective diagram that schematically shows the electrode assembly in the lithium ion secondary battery according to the present embodiment.

The lithium ion secondary battery 100 according to the present embodiment is provided with a rectangular case 50 as shown in FIG. 2 and is constituted by the placement in the interior of this case 50 of the electrode assembly 80 shown in FIG. 3 and an electrolyte solution (not shown). Each constituent is described in the following.

(1) Case

The case 50 is constituted of a flat case main body 52 open at the upper end and a lid 54 that closes this upper end. A positive electrode terminal 70 and a negative electrode terminal 72 are disposed in the lid 54. Although not shown in the figure, the positive electrode terminal 70 is electrically connected with the positive electrode of the electrode assembly in the case 50, and the negative electrode terminal 72 is electrically connected to the negative electrode.

(2) Electrode Assembly

The electrode assembly 80 in the present embodiment is, as shown in FIG. 3, a wound electrode assembly provided by winding a stack itself provided by stacking the positive electrode 10 and the negative electrode 20 with a long sheet-shaped separator 40 interposed therebetween. The structure of the electrode assembly is not limited to the wound electrode assembly as shown in FIG. 3, and various structures can be adopted. An example of another structure for this electrode assembly is a stacked electrode assembly as provided by stacking a plurality of sheet-shaped positive electrodes and negative electrodes with a separator interposed therebetween.

(a) Positive Electrode

The positive electrode 10 is provided with a long, foil-like positive electrode current collector 12 and a positive electrode mixture layer 14 formed on the surface (both sides) of the positive electrode current collector 12. The positive electrode mixture layer 14 contains a positive electrode active material that engages in the insertion and extraction of the Li ion.

A positive electrode mixture layer-free region 16, in which the positive electrode mixture layer 14 is not formed, is disposed at the edge on one side of the positive electrode 10 considered in the width direction. This positive electrode mixture layer-free region 16 is electrically connected to the aforementioned positive electrode terminal 70 (refer to FIG. 3), A lithium complex oxide is used for the positive electrode active material in the lithium ion secondary battery 100 according to the present embodiment. This lithium complex oxide can be exemplified by lithium transition metal complex oxides containing the element lithium and one or two or more transition metal elements. Specific examples of the lithium transition metal complex oxide are lithium nickel complex oxides (for example, $LiNiO_2$), lithium cobalt complex oxides (for example, $LiCoO_2$), lithium manganese complex oxides (for example, $LiMn_2O_4$), lithium nickel manganese complex oxides (for example, $LiNiO_2$), and lithium nickel cobalt manganese complex oxides (for example, $LiNi_{1/3}Co_{1/3}Mm_{1/3}O_2$). A polyanion-type (for example, an olivine-type) compound represented by the general formula $LiMPO_4$ (M in the formula is at least one or more transition metal elements from Co, Ni, Mn, and Fe) (for example, $LiFePO_4$, $LiMnPO_4$) may also be used for the lithium transition metal complex oxide.

The "lithium nickel cobalt manganese complex oxides" referenced in this Specification refer not only to oxides in which the constituent metal elements are only Li, Ni, Co, and Mn, but also encompass, for example, oxides that contain at least one metal element other than Li, Ni, Co, and Mn. The metal elements other than Li, Ni, Co, and Mn can be exemplified by transition metal elements other than Ni, Co, and Mn and/or by main group metal elements (for example, Al, Ca, Cr, Fe, V, Mg, Ti, Zr, Nb, Mo, W, Cu, Zn, Ga, In, Sn, La, and Ce). Similarly, the "lithium nickel complex oxides", "lithium cobalt complex oxides", "lithium manganese complex oxides", and "polyanion-type compounds" also encompass, for example, oxides that contain at least one other metal element.

In addition to the positive electrode active material described in the preceding, various additives can be present in the positive electrode mixture layer 14. Electroconductive materials are an example of such additives. Carbonaceous materials, e.g., carbon powder (acetylene black and so forth), carbon fiber, and so forth, are preferably used for the electroconductive material, but electroconductive metals, e.g., nickel powder, may also be used.

Binders are another example of the additives. The binder for the positive electrode mixture layer 14 may he the same type of polymeric material as used for the binder for the previously described negative electrode mixture layer.

(b) Negative Electrode

The negative electrode 20 is provided with long, foil-like negative electrode current collector 22 and a negative electrode mixture layer 24 formed on the surface (both sides) of the negative electrode current collector 22. A negative electrode mixture layer-free region 26 is formed at the edge on one side of the negative electrode 20 considered in the width direction. This negative electrode mixture layer-free region 26 is electrically connected to the aforementioned negative electrode terminal 72 (refer to FIG. 3).

The negative electrode 20 shown in FIG. 1 is used for the negative electrode of the lithium ion secondary battery 100 according to the present embodiment. A detail description is not provided here since it has already been provided in the previous embodiment, but the lithium salt 25 is incorporated in the negative electrode mixture layer 24 of this negative electrode 20. In addition, a negative electrode mixture layer 24 is formed in Which the maximum particle diameter of the lithium salt aggregates is less than 1 μm and the relationship $0 < S3/S1 \leq 4$ is satisfied by the amount S1 of the lithium salt component in the first region A1 and the amount S3 of the lithium salt component in the third region A3.

(c) Separator

A separator 40 is disposed so as to reside between the aforementioned positive electrode 10 and negative electrode 20. A ribbon-shaped sheet material of prescribed width and having a plurality of microfine holes is used for this separator 40. For example, a sheet material having a single-layer structure or a laminated structure and constituted of a porous polyolefin resin can be used. A layer of insulating particles (a filler layer) may also be formed on the surface of this sheet material. These insulating particles can be exemplified by insulating inorganic fillers (for example, fillers such as metal oxides and metal hydroxides) and insulating resin particles (for example, particles of, e.g., polyethylene or polypropylene).

(3) Electrolyte Solution

The electrolyte solution (nonaqueous electrolyte solution) is housed in the case 50 along with the aforementioned electrode assembly 80 and is filled between the positive electrode 10 and the negative electrode 20 that constitute the electrode assembly 80. The same nonaqueous electrolyte solutions as used in conventional lithium ion secondary batteries may be used without particular limitation for the instant electrolyte solution. These nonaqueous electrolyte solutions are typically constituted by incorporating a supporting salt in a nonaqueous solvent.

For example, one or two or more selections from the group consisting of ethylene carbonate, propylene carbonate, dimethyl carbonate, diethyl carbonate, ethyl methyl carbonate, 1,2-dimethoxyethane, 1,2-dimethoxyethane, tetrahydrofuran, 1,3-dioxolane, and so forth can be used as the nonaqueous solvent.

For example, a lithium salt such as $LiPF_6$, $LiBF_4$, $LiClF_4$, $LiAsF_6$, $LiCF_3SO_3$, $LiC_4F_9SO_3$, $LiN(CF_3SO_2)_2$, $LiC(CF_3SO_2)_3$, and so forth can be used as the supporting salt.

The lithium ion secondary battery 100 according to the present embodiment is constituted of the materials described above. Li ion can be efficiently supplied to the negative electrode active material 23 in the negative electrode mixture layer 24 in this lithium ion secondary battery 100 due to the use of a negative electrode 20 in which the lithium salt 25 is present in an advantageous distribution in the negative electrode mixture layer 24. As a consequence, the resistance in the negative electrode mixture layer 24 is lowered and the input/output characteristics are then substantially improved, thus enabling a particularly advantageous use in, e.g., high-output power sources for vehicles.

4. Other Embodiments

An embodiment of the present invention has been described in the preceding, but the present invention is not limited to this embodiment and various changes can be made.

For example, the target for the preceding embodiment is the negative electrode of a lithium ion secondary battery, but the herein disclosed electrode may also be used for the positive electrode of a lithium ion secondary battery.

When the herein disclosed electrode is used for the positive electrode, the effect of improved input/output characteristics can be obtained just as for use for the negative electrode, but an effect can also be obtained whereby the battery capacity is maintained due to an inhibition of decomposition of the electrolyte solution.

On the other hand, when the target is the negative electrode of a lithium ion secondary battery, as in the embodiment described above, a distinctive effect can be obtained whereby the durability characteristics are improved due to the formation of a coating film caused by the reductive decomposition of the lithium salt. Accordingly, the selection of the positive electrode or negative electrode of the lithium ion secondary battery for the application of the herein disclosed electrode is preferably made in correspondence to the particular objective. The herein disclosed electrode may be used for both the positive electrode and the negative electrode.

TEST EXAMPLES

Test examples for the present invention are described in the following, but this should not be construed to mean that the description in the test examples is a limitation on the present invention.

1. Test Examples

(1) Test Example 1

Using a negative electrode in which lithium salt was not added to the negative electrode mixture layer, a lithium ion secondary battery was fabricated in Test Example 1 to provide a comparative reference.

Specifically, a positive electrode active material ($LiNi_{1/3}Co_{1/3}Mn_{1/3}O_2$), an electroconductive material (acetylene black), and a binder (polyacrylic acid) were first mixed in proportions of 94:3:3 and were dispersed in a solvent (water) to prepare a positive electrode mixture paste. This positive electrode mixture was coated on both sides of a positive electrode current collector (aluminum foil with a thickness of 15 μm) followed by drying and rolling to fabricate a sheet-shaped positive electrode.

In this test example, a negative electrode active material (spheroidized graphite), a thickener (CMC), and a binder (PVdF) were then mixed in proportions of 98:1:1 and were dispersed in a solvent that does not dissolve salts (NMP) to prepare a negative electrode mixture paste. This negative electrode mixture was coated on both sides of a negative electrode current collector (copper foil with a thickness of 10 μm) followed by drying and rolling to fabricate a sheet-shaped negative electrode.

The separator (thickness=20 μm) used in this test example had a three-layer structure of a polyethylene (PE) layer sandwiched between two polypropylene (PP) layers.

After the positive electrode had been stacked with the negative electrode with this separator interposed therebetween, the resulting stack was wound to fabricate a flat wound electrode assembly. The thusly fabricated wound electrode assembly was electrically connected to the electrode terminals (positive electrode terminal and negative electrode terminal) followed by placement in a rectangular case along with the electrolyte solution. The case was then sealed to fabricate the lithium ion secondary battery (battery capacity=5 Ah) of Test Example 1. A nonaqueous electrolyte solution was used for the electrolyte solution; this nonaqueous electrolyte solution contained a supporting salt ($LiPF_6$) in a concentration of approximately 1.0 M in a mixed solvent that contained EC, DMC, and EMC in a volumetric ratio of 3:4:3.

(2) Test Examples 2 to 16

Here, the preparation of the negative electrode mixture paste was carried out with the addition of lithium salt to the paste and the use of a salt-dissolving solvent (water) for the solvent. The lithium ion secondary batteries of Test Examples 2 to 16 were respectively fabricated using the same conditions as in Test Example 1, with the exception that the binder was changed to CMC in conformity with the change in solvent.

The type of lithium salt used and the amount of lithium salt addition were respectively changed as shown in Table 1 for the lithium ion secondary batteries of Test Examples 2 to 16.

(3) Test Examples 17 to 20

In Test Examples 17 to 20, lithium salt was added to the negative electrode mixture paste and in combination with this a solvent that does not dissolve salts (NMP) was used for the solvent. The lithium ion secondary batteries were fabricated using the same conditions as in Test Examples 2 to 16, with the exception that the binder was changed to PVdF in conformity with the change in solvent.

(4) Test Example 21

In Test Example 21, a lithium ion secondary battery was fabricated in which the lithium salt was added to the positive electrode mixture layer, unlike in Test Examples 1 to 20. Specifically, in the preparation of the positive electrode mixture paste, a lithium salt (lithium difluorophosphate) was added to the positive electrode mixture and a salt-dissolving solvent (water) was used for the preparation of the positive electrode mixture. The other conditions were the same as in Test Example 1.

2. Evaluation Tests

(1) Measurement of S3/S1

The proportion (S3/S1) of the amount S3 of the lithium salt component in the third region to the amount S1 of the lithium salt component in the first region was then measured in these test examples on the lithium ion secondary batteries of Test Examples 1 to 21.

For this, after the lithium ion secondary battery had been fabricated, it was first disassembled and the negative electrode was removed and the negative electrode mixture layer of the negative electrode was divided into three equal parts in the thickness direction. Specifically, the following stripping process was carried out three times: a pressure-sensitive adhesive tape, which had an adhesive force that had been adjusted so as to strip off one-third of the negative electrode mixture layer, was applied to the negative electrode mixture layer and this pressure-sensitive adhesive tape was then peeled off. This yielded a pressure-sensitive adhesive tape bearing the first region of the negative electrode mixture layer, a pressure-sensitive adhesive tape bearing the second region, and a pressure-sensitive adhesive tape bearing the third region.

Ion chromatography (IC) was performed on the negative electrode mixture layer of the resulting first region and third region to measure the amount S1 of the lithium salt component in the first region and the amount S3 of the lithium salt component in the third region, and S3/S1 was calculated based on the measurement results.

(2) Measurement of Aggregate Particle Diameter

In addition, in these test examples, the particle diameter of the lithium salt aggregates was measured by carrying out cross-sectional EDS analysis on the lithium ion secondary batteries of Test Examples 1 to 21.

Specifically, the negative electrode was removed from the lithium ion secondary battery after fabrication, and the negative electrode mixture layer of this negative electrode was sectioned along the thickness direction. A photograph was taken, using a scanning electron microscope (SEM), of the cross section and element mapping of the lithium salt in the cross section of the negative electrode mixture layer was performed by carrying out analysis by energy-dispersive X-ray spectroscopy (EDS) of the SEM image. The aggregates ≥0.5 μm were identified by analysis of the obtained mapping image, and the maximum particle diameter of these aggregates was measured,

(3) IV Resistance Ratio

The IV resistance ratio was also measured on each battery in Test Examples 1 to 21. Specifically, the battery of the particular test example was charged to 50% SOC in an environment with a tempera of 25° C., followed by discharge for 10 seconds at a current value of 100 Ah, and the battery resistance (IV resistance) was determined based on the discharge current value and the amount of the voltage drop during discharge. The IV resistance ratio in each test example was calculated using the IV resistance value of Test Example 1 as the reference value (100%). These results are given in Table 1.

TABLE 1

| test example | electrode | lithium salt | amount of addition (wt %) | S3/S1 | aggregate particle diameter (μm) | IV resistance ratio (%) |
|---|---|---|---|---|---|---|
| 1 | — | — | — | — | — | 100 |
| 2 | negative electrode | lithium difluorophosphate | 0.05 | 1 | — | 80 |
| 3 | negative electrode | lithium difluorophosphate | 0.1 | 1 | — | 69 |
| 4 | negative electrode | lithium difluorophosphate | 1 | 0.5 | — | 68 |
| 5 | negative electrode | lithium difluorophosphate | 1 | 1 | — | 63 |
| 6 | negative electrode | lithium difluorophosphate | 5 | 1 | — | 79 |
| 7 | negative electrode | lithium difluorophosphate | 6 | 1 | — | 85 |
| 8 | negative electrode | lithium difluorophosphate | 10 | 1 | — | 87 |
| 9 | negative electrode | lithium difluorophosphate | 1 | 3 | — | 69 |
| 10 | negative electrode | lithium difluorophosphate | 1 | 4 | — | 72 |
| 11 | negative electrode | lithium difluorophosphate | 1 | 1 | 0.5 | 75 |
| 12 | negative electrode | lithium difluorophosphate | 1 | 1 | 0.8 | 77 |
| 13 | negative electrode | lithium sulfate | 1 | 1 | — | 75 |
| 14 | negative electrode | lithium acetate | 1 | 1 | — | 65 |
| 15 | negative electrode | lithium monofluorophosphate | 1 | 1 | — | 79 |
| 16 | negative electrode | lithium monofluorophosphate | 1 | 1 | — | 66 |
| 17 | negative electrode | lithium difluorophosphate | 1 | 0 | — | 85 |
| 18 | negative electrode | lithium difluorophosphate | 1 | 5 | — | 95 |
| 19 | negative electrode | lithium difluorophosphate | 1 | 1 | 1 | 99 |
| 20 | negative electrode | lithium difluorophosphate | 1 | 1 | 2 | 100 |
| 21 | positive electrode | lithium difluorophosphate | 1 | 1 | — | 60 |

As a result of a comparison of Test Example I with Test Examples 2 to 20, a reduction in the IV resistance could be confirmed for almost all of the test examples of the addition of lithium salt to the negative electrode mixture layer. Based on this, it could be confirmed that there was an Li intake capability in the lithium salts and the addition of such a lithium salt could achieve an efficient feed of the Li ion to the negative electrode active material in the negative electrode mixture layer and could thus improve the input/output characteristics.

However, among Test Examples 2 to 20, there were those, such as Test Examples 17 to 20, where there was little effect due to lithium salt addition and an adequate reduction in the IV resistance could not be brought about.

Specifically, with Test Example 17, for which S3/S1=0, and Test Example 18, for which S3/S1=5, the extent of the reduction in the IV resistance was small and an adequate improvement in the input/output characteristics could not be brought about. This is interpreted as being due to the segregation of the lithium salt into particular regions of the electrode mixture layer and the inability to efficiently supply Li ion to the electrode active material over the entire electrode mixture layer.

The extent of the reduction in the IV resistance was also small in Test Examples 19 and 20, and an effect due to lithium salt addition was entirely absent in Test Example 20 in particular. This is thought to be due to the following: large lithium salt aggregates having a maximum particle diameter of 1 μm or larger were formed in Test Examples 19 and 20 and the Li ion was drawn and concentrated toward these aggregates, and as a result Li ion could not be efficiently supplied to the electrode active material over the entire electrode mixture layer.

In contrast to the preceding, it was confirmed that the IV resistance underwent an advantageous reduction and the input/output characteristics were satisfactorily improved in Test Examples 2 to 16. Based on this, it was demonstrated that—by forming a negative electrode mixture layer in which the maximum particle diameter of the lithium salt aggregates is less than 1 μm and in which the relationship 0<S3/S1≤4 is satisfied by S3/S1, which is the ratio between the amounts of the lithium salt component in the third region A3 and the first region A1—a favorable distribution of the lithium salt is brought about and Li ion can be efficiently supplied to each portion of the negative electrode active material.

When Test Examples 5, 13, 14, and 15 are compared, the IV resistance underwent a satisfactory decline in all of these test examples, but the IV resistance underwent the greatest reduction in Test Example 5. The following could be confirmed based on this: at least lithium sulfate, lithium acetate, lithium monofluorophosphate, and lithium difluorophosphate can be used as the lithium salt for addition to the negative electrode mixture layer, while lithium difluorophosphate is particularly preferred there among.

A comparison of Test Examples 2 to 8 demonstrates the following: the amount of lithium salt addition has an effect on the IV resistance and, by adjusting the amount of lithium salt addition into the range of 0.1 wt % to 5 wt % as in Test Examples 3 to 6, the IV resistance is more favorably reduced and the input/output characteristics can be improved.

The present invention has been described in detail in the preceding, but the embodiments provided above are nothing more than examples, and the herein disclosed invention encompasses various modifications and alterations of the specific examples provided in the preceding.

What is claimed is:

1. A lithium ion secondary battery electrode comprising a foil-like electrode current collector;
an electrode mixture layer disposed on a surface of the electrode current collector, and containing a particulate electrode active material, wherein
a lithium salt having a lithium ion intake capability is added to the electrode mixture layer;
dividing the electrode mixture layer into three equal regions in a thickness direction thereof, and
with these three regions being a first region, a second region, and a third region from the electrode current collector side to the surface of the electrode mixture layer, the amount S1 of the lithium salt component in the first region and the amount S3 of the lithium salt component in the third region satisfy the relationship in formula (1); and
a maximum particle diameter of aggregates of the lithium salt present in the electrode mixture layer is less than 1 µm:

$$0 < S3/S1 \leq 4 \qquad (1).$$

2. The lithium ion secondary battery electrode according to claim 1, wherein the surface of the electrode active material is coated with the lithium salt in at least the first region.

3. The lithium ion secondary battery electrode according to claim 1, wherein the lithium salt is any of lithium acetate, lithium fluorophosphate, and lithium sulfate.

4. The lithium ion secondary battery electrode according to claim 3, wherein the lithium fluorophosphate is lithium difluorophosphate.

5. The lithium ion secondary battery electrode according to claim 1, wherein the content of the lithium salt is 0.1 wt % to 5 wt %, Where a total mass of solid fraction of the electrode mixture layer is 100 wt %.

6. A lithium ion secondary battery provided with a positive electrode in which a positive electrode mixture layer is formed on a surface of a positive electrode current collector, a negative electrode in which a negative electrode mixture layer is formed on a surface of a negative electrode current collector, and an electrolyte solution filled between the positive electrode and the negative electrode, wherein
the lithium ion secondary battery electrode according to claim 1 is used for at least one of the positive electrode and the negative electrode.

7. The lithium ion secondary battery according to claim 6, wherein the lithium ion secondary battery electrode is used for the positive electrode.

* * * * *